United States Patent
Douglas

(10) Patent No.: US 11,354,355 B2
(45) Date of Patent: *Jun. 7, 2022

(54) APPARATUS, METHOD, AND COMPUTER-READABLE MEDIUM FOR CUE POINT GENERATION

(71) Applicant: MIXED IN KEY LLC, Miami, FL (US)

(72) Inventor: Martin Douglas, Canterbury (GB)

(73) Assignee: MIXED IN KEY LLC, Miami, FL (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/508,081

(22) Filed: Jul. 10, 2019

(65) Prior Publication Data
US 2019/0332629 A1 Oct. 31, 2019

Related U.S. Application Data

(63) Continuation of application No. 15/633,436, filed on Jun. 26, 2017, now Pat. No. 10,366,121.

(Continued)

(51) Int. Cl.
*G06F 16/68* (2019.01)
*G10H 1/00* (2006.01)
(Continued)

(52) U.S. Cl.
CPC .......... *G06F 16/686* (2019.01); *G06F 16/683* (2019.01); *G10H 1/0008* (2013.01);
(Continued)

(58) Field of Classification Search
CPC ... G06F 16/686; G06F 16/683; G10H 1/0008; G10H 1/40; G10H 2210/061; G10H 2210/076; G10H 2210/091
(Continued)

(56) References Cited

U.S. PATENT DOCUMENTS

| 6,542,869 B1* | 4/2003 | Foote | G10H 1/00 704/500 |
| 2006/0075886 A1* | 4/2006 | Cremer | G10H 1/40 84/635 |
| 2010/0011941 A1* | 1/2010 | Becker | G10H 1/00 84/612 |
| 2010/0023864 A1* | 1/2010 | Lengeling | G11B 27/34 715/727 |
| 2014/0123836 A1* | 5/2014 | Vorobyev | G10H 1/0008 84/616 |

(Continued)

FOREIGN PATENT DOCUMENTS

GB 2506404 A 4/2014

OTHER PUBLICATIONS

Pioneer, "Music Management Software: Rekordbox Operating instructions", 2009, Pioneer Corporation, http://faq.pioneerdj.com/files/img/Manual_rekordbox_en.pdf, pp. 1-117.

*Primary Examiner* — Phong H Nguyen
(74) *Attorney, Agent, or Firm* — Oblon, McClelland, Maier & Neustadt, L.L.P.

(57) ABSTRACT

An apparatus, method, and computer-readable storage medium that generate at least a cue point in a musical piece. The method includes generating a beat grid representing the musical piece, determining values for the beat grid, the values corresponding to an audio feature of the musical piece, and each value representing an entire duration of each beat in the beat grid of the musical piece, calculating a score for the audio feature at each of a plurality of positions in the beat grid of the musical piece, using some or all of the determined values, and generating the cue point at a particular position of the plurality of positions, based on the calculated scores.

17 Claims, 6 Drawing Sheets

Related U.S. Application Data

(60) Provisional application No. 62/354,316, filed on Jun. 24, 2016.

(51) Int. Cl.
*G10H 1/40* (2006.01)
*G06F 16/683* (2019.01)

(52) U.S. Cl.
CPC ......... *G10H 1/40* (2013.01); *G10H 2210/061* (2013.01); *G10H 2210/076* (2013.01); *G10H 2210/091* (2013.01)

(58) Field of Classification Search
USPC .......................................................... 707/741
See application file for complete search history.

(56) References Cited

U.S. PATENT DOCUMENTS

| | | | | |
|---|---|---|---|---|
| 2014/0225845 | A1* | 8/2014 | Muzar | G06F 3/041 345/173 |
| 2014/0355789 | A1* | 12/2014 | Bohrarper | H04N 21/4661 381/119 |
| 2015/0142147 | A1* | 5/2015 | Stanghed | G06F 16/683 700/94 |
| 2015/0341410 | A1* | 11/2015 | Schrempp | G06V 20/46 709/231 |
| 2016/0172000 | A1* | 6/2016 | Ju | G11B 27/034 386/241 |
| 2016/0372095 | A1* | 12/2016 | Lyske | G06F 16/24575 |
| 2017/0115955 | A1* | 4/2017 | Zalon | G11B 27/28 |

* cited by examiner

APPARATUS, METHOD, AND COMPUTER-READABLE MEDIUM FOR CUE POINT GENERATION

CROSS REFERENCE TO RELATED APPLICATION(S)

This application is a continuation of and is based upon and claims the benefit of priority under 35 U.S.C. § 120 for U.S. Ser. No. 15/633,436, filed Jun. 26, 2017, which is based on and claims the benefit from U.S. Provisional Application No. 62/354,316, filed Jun. 24, 2016, the entire contents of each which are incorporated herein by reference.

BACKGROUND

Field

Embodiments described herein relate to the field of cue point generation in musical pieces.

Background

A cue point refers to a marker (identified by minute/second) within a musical piece (for example, a track or a song) that is used to indicate/mark a particular area within that musical piece. A cue point may be used to indicate various "important" parts of a musical piece. For example, a cue point may be used to identify the start of the vocals in the musical piece, to identify a good place to start the musical piece in a mix, to identify the start of a particular melody or instrument within the musical piece, to identify a "breakdown," to identify a "drop," or any other portion that may be of interest.

However, it can be very difficult generating cue points that are accurate and musically correct (for example, on beat) due to complexity and variation of different musical pieces (for example, different songs from different genres).

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

Figure 1:
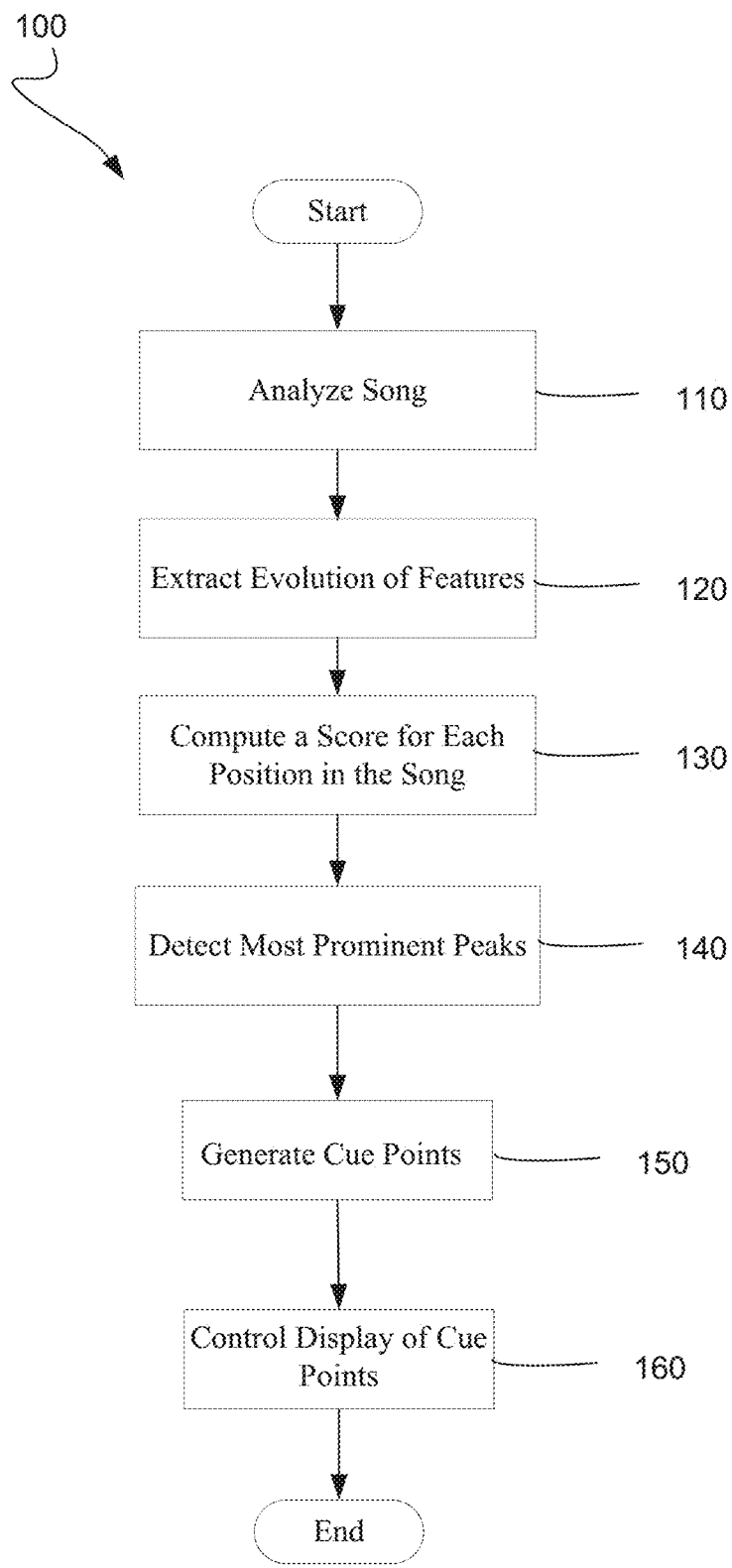
FIG. 1 illustrates a flowchart of a process according to one embodiment.

One embodiment of the present disclosure is drawn to an apparatus that generates at least a cue point in a musical piece, the apparatus comprising: processing circuitry configured to generate a beat grid representing the musical piece, determine values for the beat grid, the values corresponding to an audio feature of the musical piece, and each value representing an entire duration of each beat in the beat grid of the musical piece, calculate a score for the audio feature at each of a plurality of positions in the beat grid of the musical piece, using some or all of the determined values, the score being calculated by comparing, at each of the plurality of positions, combinations of determined values of the audio feature before a respective position of the plurality of positions with determined values of the audio feature after the respective position, and generate the cue point at a particular position of the plurality of positions, based on the calculated scores.

In one embodiment, the processing circuitry is further configured to determine other values for the beat grid, the other values corresponding to another audio feature of the musical piece, calculate another score for the another audio feature at each of the plurality of positions in the beat grid of the musical piece, using some or all of the determined other values, the another score being calculated by comparing, at each of the plurality of positions, combinations of determined other values of the another audio feature before the respective position of the plurality of positions with determined values of the another audio feature after the respective position, and generate the cue point at the particular position based on both the calculated scores of the audio feature and the calculated another scores of the another audio feature.

In one embodiment, the audio feature corresponds to transient energy and the another audio feature corresponds to melodic energy such that the processing circuitry generates the cue point at the particular position based on the calculated scores of the transient energy and the calculated another scores of the melodic energy.

In one embodiment, at least some of the combinations of determined values of the audio feature are different than the combinations of determined other values of the another audio feature.

In one embodiment, the plurality of positions in the beat grid are spaced 4 beats, 8, beats, 16 beats, or 32 beats apart.

In one embodiment, the processing circuitry is further configured to generate a plurality of cue points at particular positions of the plurality of positions, based on both the calculated scores of the audio feature and the calculated another scores of the another audio feature, each of the generated plurality of cue points being at least 32 beats apart.

In one embodiment, the processing circuitry is further configured to calculate the score by performing a first comparing of 16 determined values of the audio features before the respective position with 16 determined values of the audio feature after the respective position, a second comparing of 8 determined values of the audio features before the respective position with 8 determined values of the audio feature after the respective position, a third comparing of 4 determined values of the audio features before the respective position with 4 determined values of the audio feature after the respective position, and a fourth comparing of 2 determined values of the audio feature before the respective position with 2 determined values of the audio feature after the respective position, and then summing results of the first comparing, the second comparing, the third comparing, and the fourth comparing.

One embodiment of the present disclosure is drawn to a method that generates at least a cue point in a musical piece, the method comprising: generating a beat grid representing the musical piece; determining values for the beat grid, the values corresponding to an audio feature of the musical piece, and each value representing an entire duration of each beat in the beat grid of the musical piece; calculating a score for the audio feature at each of a plurality of positions in the beat grid of the musical piece, using some or all of the determined values, the score being calculated by comparing, at each of the plurality of positions, combinations of determined values of the audio feature before a respective position of the plurality of positions with determined values of the audio feature after the respective position; and generating the cue point at a particular position of the plurality of positions, based on the calculated scores.

In one embodiment, the method further comprises determining other values for the beat grid, the other values corresponding to another audio feature of the musical piece; calculating another score for the another audio feature at each of the plurality of positions in the beat grid of the musical piece, using some or all of the determined other values, the another score being calculated by comparing, at each of the plurality of positions, combinations of determined other values of the another audio feature before the respective position of the plurality of positions with determined values of the another audio feature after the respective position; and generating the cue point at the particular position based on both the calculated scores of the audio feature and the calculated another scores of the another audio feature.

In one embodiment, the audio feature corresponds to transient energy and the another audio feature corresponds to melodic energy such that the generating generates the cue point at the particular position based on the calculated scores of the transient energy and the calculated another scores of the melodic energy.

In one embodiment, at least some of the combinations of determined values of the audio feature are different than the combinations of determined other values of the another audio feature.

In one embodiment, the plurality of positions in the beat grid are spaced 4 beats, 8, beats, 16 beats, or 32 beats apart.

In one embodiment, the method further comprises generating a plurality of cue points at particular positions of the plurality of positions, based on both the calculated scores of the audio feature and the calculated another scores of the another audio feature, each of the generated plurality of cue points being at least 32 beats apart.

In one embodiment, the calculating calculates the score by performing a first comparing of 16 determined values of the audio features before the respective position with 16 determined values of the audio feature after the respective position, a second comparing of 8 determined values of the audio features before the respective position with 8 determined values of the audio feature after the respective position, a third comparing of 4 determined values of the audio features before the respective position with 4 determined values of the audio feature after the respective position, and a fourth comparing of 2 determined values of the audio feature before the respective position with 2 determined values of the audio feature after the respective position, and then summing results of the first comparing, the second comparing, the third comparing, and the fourth comparing.

One embodiment of the present disclosure is drawn to a non-transitory computer-readable storage medium including computer executable instructions, wherein the instructions, when executed by a computer, cause the computer to perform a method that generates at least a cue point in a musical piece, the method comprising: generating a beat grid representing the musical piece; determining values for the beat grid, the values corresponding to an audio feature of the musical piece, and each value representing an entire duration of each beat in the beat grid of the musical piece; calculating a score for the audio feature at each of a plurality of positions in the beat grid of the musical piece, using some or all of the determined values, the score being calculated by comparing, at each of the plurality of positions, combinations of determined values of the audio feature before a respective position of the plurality of positions with determined values of the audio feature after the respective position; and generating the cue point at a particular position of the plurality of positions, based on the calculated scores.

In one embodiment, the non-transitory computer-readable storage medium further comprises determining other values for the beat grid, the other values corresponding to another audio feature of the musical piece; calculating another score for the another audio feature at each of the plurality of positions in the beat grid of the musical piece, using some or all of the determined other values, the another score being calculated by comparing, at each of the plurality of positions, combinations of determined other values of the another audio feature before the respective position of the plurality of positions with determined values of the another audio feature after the respective position; and generating the cue point at the particular position based on both the calculated scores of the audio feature and the calculated another scores of the another audio feature.

In one embodiment, the audio feature corresponds to transient energy and the another audio feature corresponds to melodic energy such that the generating generates the cue point at the particular position based on the calculated scores of the transient energy and the calculated another scores of the melodic energy.

In one embodiment, at least some of the combinations of determined values of the audio feature are different than the combinations of determined other values of the another audio feature.

In one embodiment, the plurality of positions in the beat grid are spaced 4 beats, 8, beats, 16 beats, or 32 beats apart.

In one embodiment, the non-transitory computer-readable storage medium further comprises generating a plurality of cue points at particular positions of the plurality of positions, based on both the calculated scores of the audio feature and the calculated another scores of the another audio feature, each of the generated plurality of cue points being at least 32 beats apart.

The present disclosure relates to automatically generating one or more cue points in a musical piece. In one embodiment, a musical piece may be a piece of audio or music including at least one measure of music (containing, for example, a minimum of 4 beats). In one embodiment, a musical piece may be a piece of music that is less than one measure (containing one, two, or three beats). In one embodiment, a musical piece may be an entire song or track.

As discussed above, a cue point refers to a marker (identified by minute/second) within a song that is used to mark a particular area of the song. After generation, cue points may be exported or embedded in a song so they can be read by musical applications (for example, disc-jockey (DJ) software). The cue points should be placed at positions which are useful for a DJ, for example at the beginning of different parts of the song such as intro, chorus, verse, bridge, etc. There may be a limitation of 8 cue points that can be used by DJ software, so the cue point generation method described in the embodiments herein measures how "good" each detected cue point is so that only the best cue points are returned (especially if more than 8 cue points are generated).

In order to guide algorithm development, parameter choices, and type of audio feature extraction used as input to the cue point generation method, a set of ground truth cue points are acquired for a collection of songs. The accuracy of the detection can then be measured by comparing the predicted cue point positions with those cue points that have been chosen (for example, automatically or by a human). This also allows automatic parameter optimization by recursively modifying parameter values and keeping those changes which result in an improvement in accuracy. Further, note that the method 100 discussed throughout the present disclosure may employ neural networks to learn from past data/results in order to improve future results. For example, if particular functions or weights have produced better results in the past, such functions or weights may be used for future analysis, while other functions or weights may be ignored as having produced unreliable results.

FIG. 1 describes a method 100 of generating cue points according to an embodiment. At step 110, a musical piece (such as a song) is first analyzed to generate a beat grid for the song. This can be performed by determining audio features (such as strong transients) in the song and selecting the best beat pattern that matches those features (transients). In one embodiment, the method 100 may first normalize the loudness of the musical piece (such as the song so that particularly loud songs are reduced in volume, and quiet songs are boosted in volume. This normalization may be performed at the beginning of method 100 or at another point in the process.

Next, at step 120, the song is analyzed to extract the evolution of different features over time. Feature extraction is the process of computing a compact numerical representation that can be used to characterize a segment of audio (or a musical piece such as a song). These features are audio features and may include, for example, transient energy, melody or melodic energy, harmonic energy, noise energy, harmonic/noise ratio, autocorrelation, zero crossing rate, spectral flatness, spectral centroid, spectral spread, spectral skewness, spectral kurtosis, spectral slope, roll-off frequency, mel-frequency cepstral coefficients, etc.

Note that a transient is a high amplitude, short-duration sound at the beginning of a waveform. In other words, a transient is the loud and sharp section at the beginning of a sound. For example, the transient section of a kick drum would be the click sound, the initial impact and would not be the low end thump that comes slightly later. Naturally, a transient is the loudest part of the sound and is what gives the sound its punch or impact. Note that melody or melodic energy may be similar to harmonic energy, but may only involve audio frequencies above a certain value (such as 250 Hz) in its calculation—in such case, bass sounds would be ignored.

The audio features may also be filtered so that they capture specific frequency ranges. The method 100 may apply a filter to any of the audio features, prior to calculating the respective feature, so that only a certain frequency range or certain frequencies that are important for audio/musical perception are emphasized. For example, the method 100 may use an audio equalizer that applies the inverse of an "equal-loudness contour," which may improve the results, due to the fact that the human auditory system has different sensitivities to different frequencies. In one embodiment, the method 100 array use a standard curse (such as the standard "A-weighting" curve) at any point prior to calculating features. Using such curve weights different frequencies and may thus improve performance.

Note that one audio feature or a plurality of features can be used in cue point generation. For example, in one embodiment, both transients and melody may be used to generate cue points. Using two features (or more) may improve the accuracy of the cue points thereby resulting in a more robust result.

Figure 2:
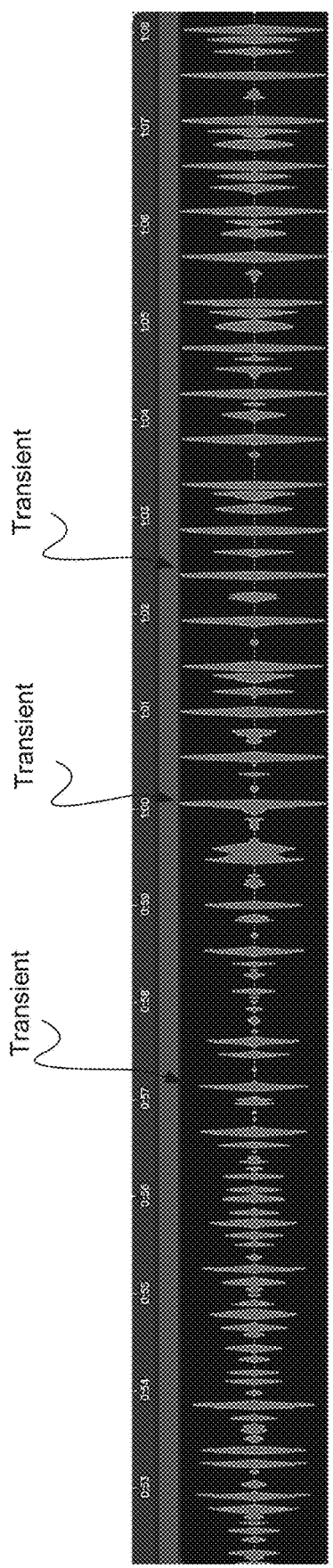
FIG. 2 illustrates an example of an audio feature extraction for a portion of a musical piece according to one embodiment.

FIG. 2 illustrates an example of the transient extraction (transient magnitude feature) for a portion of a song where a cue point may or should be generated. For each feature, the value over time is then quantized by calculating an overall value for the duration of each beat, by using the previously generated/calculated beat grid (the beat grid from step 110). Any method for calculating the overall value for each beat can be used, as long as it results in good accuracy. Examples of calculating the overall value for each beat include calculating the arithmetic mean, geometric mean, root mean square (RMS), or standard deviation.

Figure 3:
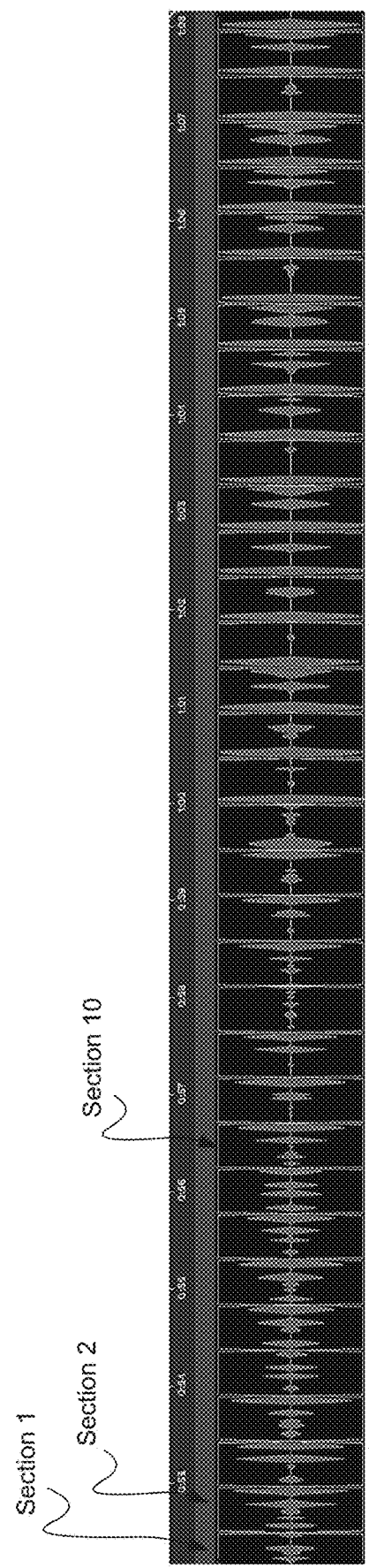
FIG. 3 illustrates an example in which slightly overlapping windows are used for each beat according to one embodiment.

FIG. 3 illustrates an example in which slightly overlapping windows are used for each beat. Note that each section (denoted by the vertical lines, and indicated as Section 1, Section 2, etc.) in FIG. 3 corresponds to a window and a beat. The amplitude or magnitude for the particular feature (for example, transient energy) is averaged for each window (i.e., for each beat duration, since each window represents a beat) using, for example, RMS, resulting in the quantized data shown in FIG. 4.

This results in an array of values for each feature used. For example, for a song of length 4 minutes and a tempo of 128 beats-per-minute (BPM), this results in an array of values of size 512 for each audio feature. The next step 130 in the method 100 is to compute a score for each of the 512 positions/beats. This score corresponds to how likely it is that a cue point should be generated at that position.

Figure 5:
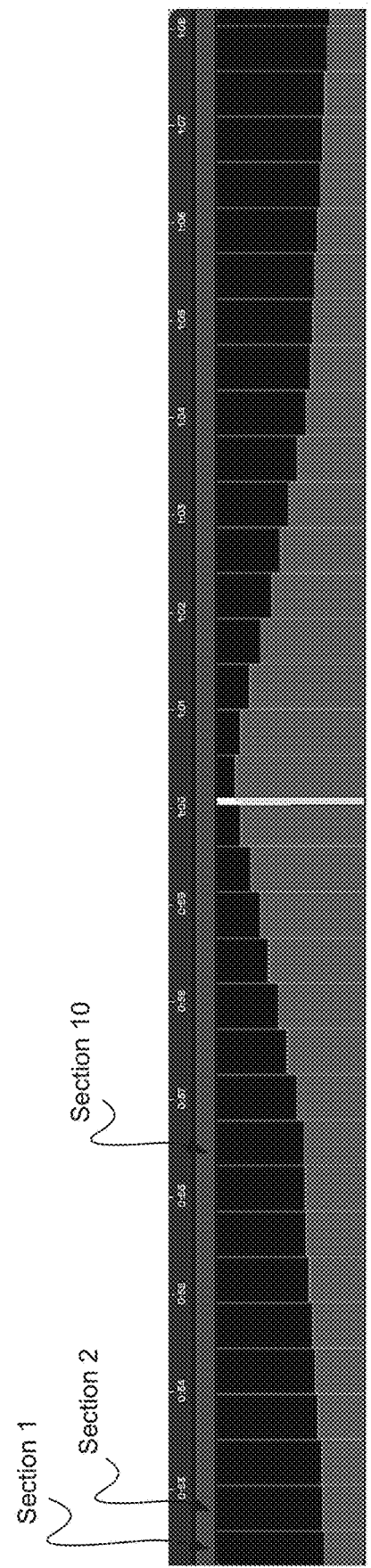
FIG. 5 illustrates a likelihood curve for a musical piece portion where a cue point should be detected according to one embodiment.
Figure 6:
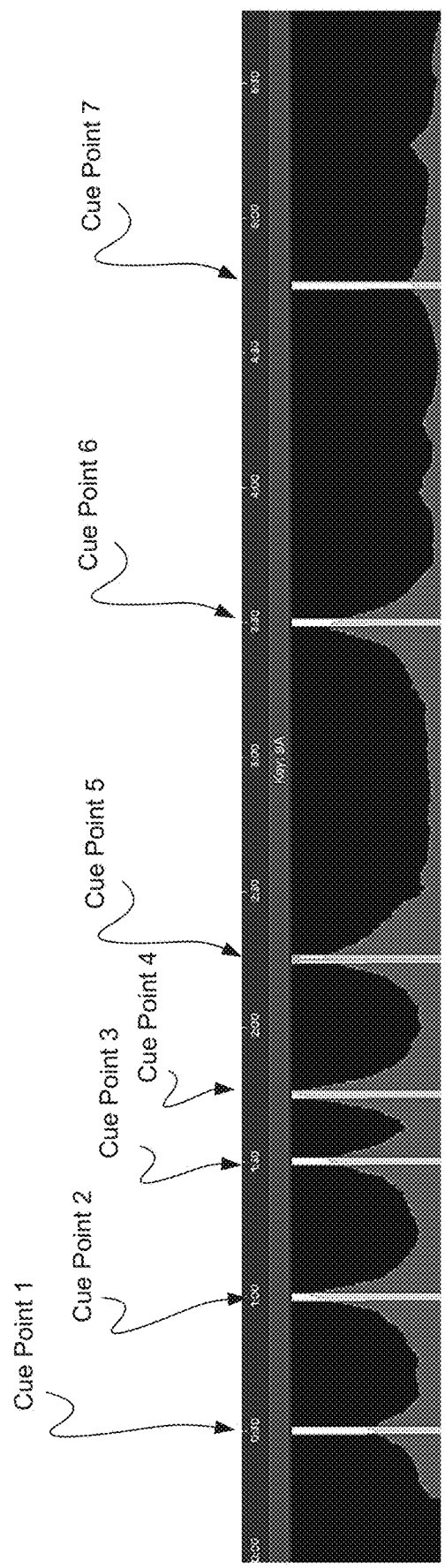
FIG. 6 illustrates the likelihood curve for the entire musical piece according to one embodiment.

FIG. 5 shows the likelihood curve for the song portion where a cue point should be detected (i.e., this shows the resulting values for each section/beat of a portion of the song), and FIG. 6 shows generated cue point locations for the entire song (note that in the example of FIG. 6, the song is over 6 minutes and 30 seconds in length). Note that the calculation used to achieve the results illustrated in FIGS. 5 and 6 is discussed below with reference to FIG. 7. Based on the calculated score values (for example, the 512 score values), the method 100 detects the most prominent peaks at step 140. At step 150, these peaks are used to generate the cue points.

Next, at step 160, the method 100 controls the display of the generated cue points. For example, the method 100 may instruct a display (such as display 610 of FIG. 8, discussed below) to display the cue points on the beat grid as illustrated in FIG. 6. Each cue point may be displayed using a different color or other indicator to provide additional information to the viewer. For example, a blue cue point mark may indicate the beginning of a chorus, a red cue point mark may indicate a drop, a green cue point mark may indicate a breakdown, etc.

Returning to step 130 of FIG. 1, the score for a beat position is calculated as a sum of scores calculated separately for each feature (which may be, for example, transients, melody, noise, spectral centroid, etc.) for that beat position. Each feature score may be given a different weight so that some features contribute more to the final score than others. For example, the weight for transient audio feature may be higher than the weight for spectral centroid audio feature.

For example, for 3 features, the score for beat "x" is calculated as:

$$S(x) = f_1 \cdot S_1(x) + f_2 \cdot S_2(x) + f_3 \cdot S_3(x)$$

Figure 7:
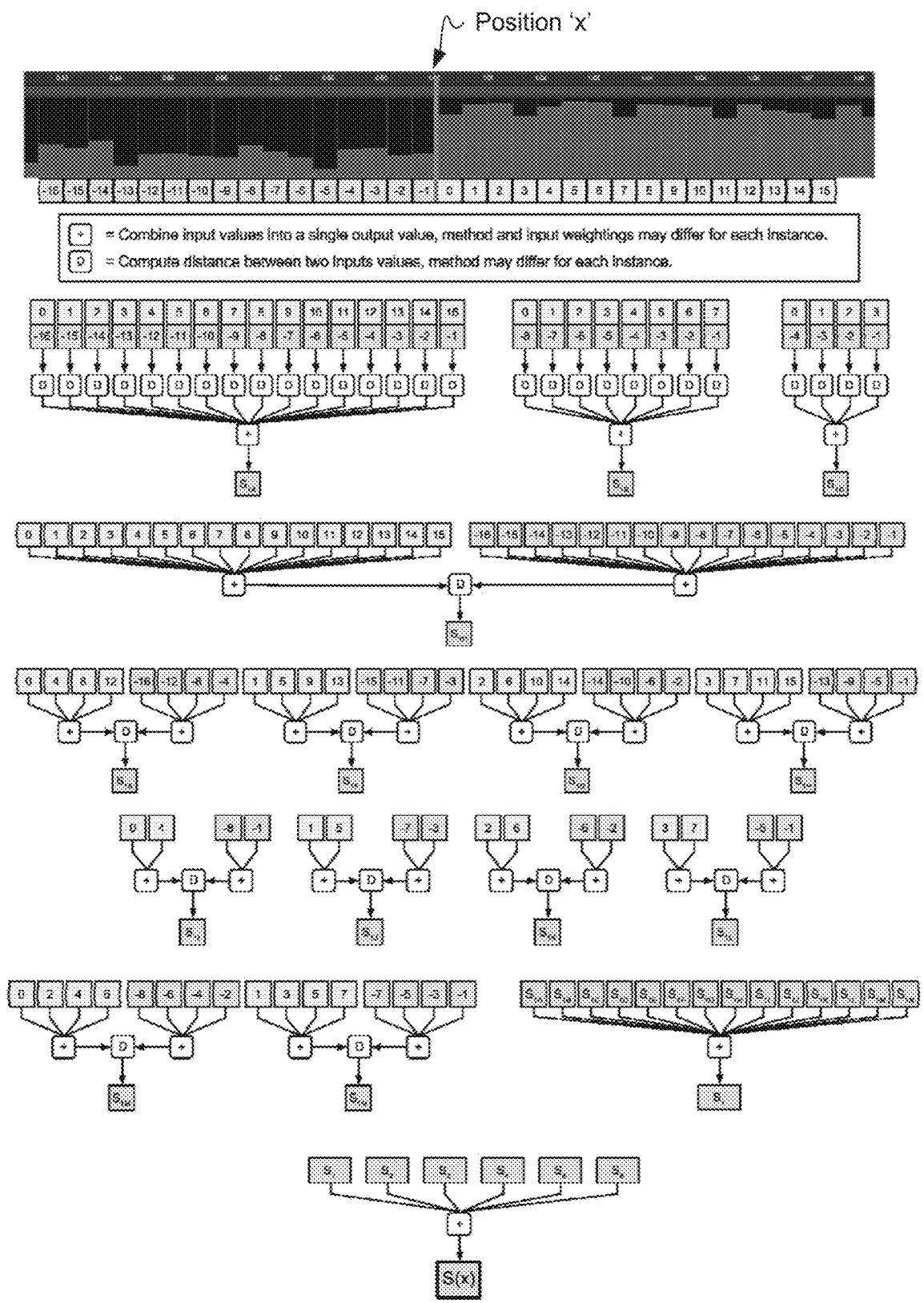
FIG. 7 illustrates an example of a computation of differences between a left side and a right side of a particular beat/position for a single audio feature according to one embodiment.

Note, this is the final calculation illustrated in FIG. 7, in which S(x) represents the total calculated score at position/beat "x." In the above expression, $S_i$ (for example, $S_1, S_2, S_3$) is the score calculated for feature i, and $f_i$ (for example, $f_1, f_2, f_3$) is the weight applied to feature i. Note that $f_1, f_2,$ and $f_3$ may be different weights, in one embodiment. In one embodiment, some or all of these weights may be the same. Further, note that the weights can be automatically selected to generate the best cue point detection results.

The individual feature score $S_i(x)$ is calculated by analyzing the difference between the values on the left side (for example, times before the time of position x) compared to the values on the right side (for example, times after the time of position x) for that feature (transient energy in the example of FIG. 7) at position x. A large difference between the left and right sides results in a large score, thereby a possible location for a cue point.

Songs generally repeat in beats of size $2^n$ for positive integer n, such as 32, 16, and 8 beats. Thus, in one embodiment, the method 100 compares groups of values in those sizes. Comparing features that are spaced apart by other beat counts, for example 3, 12, or 17, will generally result in a large difference at every position in the song and would thus result in unfavorable results (i.e., generation of inaccurate cue points). As such, in one embodiment, the method 100 compares groups of values of size $2^n$ (such as 32, 16, and 8 beats) only.

Several scores are calculated for different phrases, sizes, and patterns, and combined to create a final score for a feature at each beat position (position "x" in FIG. 7 being one such position). The scores are assigned weights when combining to give the best accuracy when comparing the resulting cue points with the ground truth data.

FIG. 7 shows an example of the computation of differences between the left side (times before the 1:00 minute mark) and the right side (times after the 1:00 minute mark) of the beat (for example, beat "x"/position "x") located at 1:00 minute in the exemplary song for a single audio feature (which in this case is the transient energy). Similar computations may also be made for the other features (i.e., melodic energy, harmonic energy, noise energy, spectral centroid, etc.) of the song, and combined to generate the final score value S(x). In FIG. 7, note that negative numbers represent the beats before the current marker (i.e., position "x"), and positive numbers represent the beats after the current marker (i.e., position "x").

Although the embodiment of FIG. 7 illustrates calculations for position/beat "x" at the 1:00 minute mark, the method 100 may actually start performing these calculations at the first beat in the musical piece (i.e., the 0:00 minute mark or close to it, aligned to the detected beat grid), or the calculations may be started at a later point in the musical piece (if, for example, there is some silence at the beginning of the song). The method 100 then progresses iteratively by calculating the score for every beat position after that, which would result in the data shown in FIGS. 5 and 6.

However, in one embodiment, the method 100 may not perform calculations (such as those illustrated in FIG. 7) at every beat. For example, the method 100 may calculate the score only for every fourth beat. In other words, the method 100 may calculate a score for beat 0, then skip beats 1, 2, and 3, then calculate a score for beat 4, followed by skipping beats 5, 6, and 7, and so forth. Then the method 100 may calculate more scores only around the local peaks in the score graph, because that is where a potential cue point would likely be. Of course, in one embodiment, the method 100 may perform calculations every 8, 16, or 32 beats.

The method 100 may automatically decide which approach to follow based on the analysis of the musical piece. For example, if the method 100 detects the beat grid of the musical piece as having a particular structure example, if the method 100 determines the musical piece is an electronic dance music song), the repetitions likely take place every 16 or 32 beats. Thus, the method 100 may perform the calculations of FIG. 7 every 4, 8, 16, etc. beats.

However, if the method detects that the beat grid of the musical piece does not follow a particular structure (for example, if the method 100 determines the musical piece is a live recording from a song from the 1950s), then the method 100 may perform the calculations at every beat to make sure the correct cue points are generated.

Figure 4:
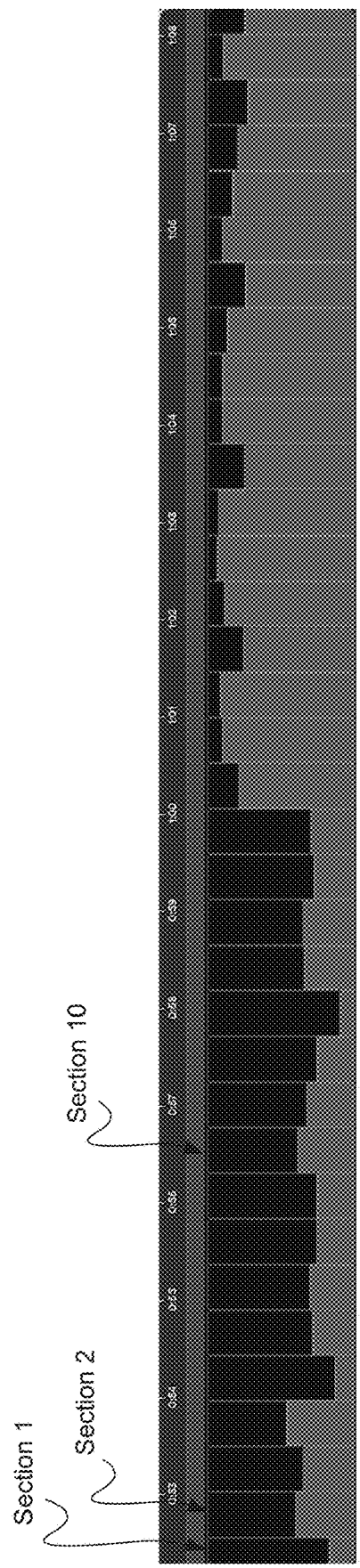
FIG. 4 illustrates beat aligned data according to one embodiment.

Note that FIG. 7 corresponds to the beat aligned data of FIG. 4. In the example illustrated in the embodiment of FIG. 7, 16 values are used before and after the position being tested (in this case, the position is at the 1:00 minute mark). However, in one embodiment, more or less values may be used (e.g., 32, 64, 8, etc.). In one embodiment, larger or smaller ranges of values may be used in addition to other ranges.

For example, in FIG. 7, $S_{1A}$ shows 16 values being used before and after the position being tested, and $S_{1B}$ shows 8 values being used before and after the position being tested. However, $S_{1A}$ may use 32 values instead of 16. Similarly, other values may be used for $S_{1B}, S_{1C}$, etc.

Further, other patterns of comparing and combining feature values may be used. The following are examples of other patterns that may be used:

$$D([0] + [8], [-16] + [-8])$$
$$D([1] + [9], [-15] + [-7])$$
$$\ldots$$
$$D([7] + [15], [-9] + [-1])$$
$$D([0] + [4] + [8] + [12] + [16] + [20] + [24] + [28], [-32] +$$
$$[-28] + [-24] + [-20] + [-16] + [-12] + [-8] + [-4])$$
$$D([1] + [5] + [9] + [13] + [17] + [21] + [25] + [29], [-31] +$$
$$[-27] + [-23] + [-19] + [-15] + [-11] + [-7] + [-3])$$
$$D([2] + [6] + [10] + [14] + [18] + [22] + [26] + [30], [-30] + [-26] +$$
$$[-22] + [-18] + [-14] + [-10] + [-6] + [-2])$$
$$D([3] + [7] + [11] + [15] + [19] + [23] + [27] + [31], [-29] + [-25] +$$
$$[-21] + [-17] + [-13] + [-9] + [-5] + [-1])$$
$$D([0] + [1] + [2] + [3], [-8] + [-7] + [-6] + [-5])$$
$$D([4] + [5] + [6] + [7], [-4] + [-3] + [-2] + [-1])$$

The difference, or distance function D(x, y), used for comparing values derived from the left and right sides, can be any function which returns a larger value when the difference is larger. As an example, in FIG. 7 starting from the left-most column for the calculation of $S_{1A}$, the distance function compares value(s) at position "0" with value(s) at position "−16," compares value(s) at position "1" to value(s) at position "−15," compares value(s) at position "2" to value(s) at position "−14," and so on. To reiterate, position "0" and position "−16" (and any other position shown, for example, in FIG. 7) denotes the values at those positions. For example, in this instance "0" and "−16" are indices referring to an array of values calculated for those positions.

For each phrase size that is tested of size $2^n$ beats, values that are $2^n$ beats apart are compared using the distance function. The best functions and constants used for each comparison can be determined beforehand by testing the final calculated cue points against the ground truth data and selecting the cue points resulting in the highest accuracy.

Examples of a D(x, y) function include:

$D(x, y) = m \cdot abs(x-y)$; $m=1$ when $x \geq y$, or $m=c$ when $x<y$ (c is a constant)

$D(x, y) = m \cdot (x-y) \cdot (x-y)$; $m=1$ when $x \geq y$, or $m=c$ when $x<y$ (c is a constant)

An increase in accuracy may be achieved for some feature comparisons by treating a positive value change from left side to right side differently from a negative value change. It can be beneficial to favor cue points landing on an increase in amplitude rather than a decrease in amplitude, so the method 100 can reduce the score when the left side is higher than the right side by scaling the resulting distance calculation by a constant less than 1, as shown in the example functions above. Note that the constant can be different for each function instance.

Feature values and scores are combined using a function which takes in multiple values and returns a single overall value, and represents a summary of all the values. In the embodiment of FIG. 7, the combine function is represented as "+." However, the present disclosure is not limited to the sum of values. For combining scores, the function can be one that roughly represents the overall magnitude of the input values, such as mean or RMS.

For combining feature values, the function may be any function that calculates a single value given multiple input values, such as mean, RMS, and standard deviation. Also, the inputs to the combine function can be given different weights, so some inputs contribute more to the final output than others. In one embodiment, these weights and the combine functions used can be selected beforehand to give the best cue point detection accuracy when compared to a ground truth dataset.

FIG. 7 illustrates one embodiment of the calculation of $S_1$. Note that each of the calculations of $S_2$, $S_3$, $S_4$, $S_5$, and $S_6$ may be performed in the same manner or a different manner. For example, the calculation of $S_2$ may be performed with 8 beats (as opposed to 16 beats as in $S_1$). Moreover, the calculation of S(x) (beat "x" located at 1:00) may be performed using the same methodology for each of $S_1$, $S_2$, $S_3$, $S_4$, $S_5$, and $S_6$, while the calculation for S(y) (beat "y" located at 1:30) may be calculated using a different methodology (for example, using only 8 beats or using a mean or RMS calculation). In other words, any combination is within the scope of the present disclosure. Furthermore, as discussed above, $S_1$ may represent the feature of transient energy, whereas $S_2$ may represent the feature of melodic energy, $S_3$ may represent the feature of noise energy, $S_4$ may represent the feature of zero crossing rate, $S_5$ may represent the feature of spectral centroid, and $S_6$ may represent spectral scope.

Once the overall score for each beat location/position has been computed, cue point locations are determined by detecting peaks in the score data, as shown in FIG. 7. Next, the method 100 generates a cue point at each location. In one embodiment, the method 100 searches for local peaks where the score values at either side of a score is lower than the current score being tested.

The method 100 may be improved further by using certain heuristics. For example, the method 100 may ignore peaks that are too close to other larger peaks. Phrases are usually no less than 32 beats, so it is unlikely that two cue points would be less than 32 beats apart. Note that typically there are 4 beats in every bar, and a phrase typically has 8 bars (i.e., a phrase is usually 32 beats). Also, it is more likely that the distance between the start of different passages in a song will be a multiple of 32, 16, 8, or 4 beats. Such criteria can be used by the method 100 to improve the robustness of the generated cue points, the cue points can be nudged by a small distance in order to maintain those distances, as long as the returned cue point locations are still within or near the main lobe of the peak in the score data.

Peaks that are not very prominent or are below a certain threshold can be ignored to prevent erroneous cue points from being generated. For example, if the peak magnitude is below a certain percentage of the maximum peak in the score data, or if the peak magnitude is not significantly larger (i.e., exceeding a predetermined threshold) than the score values around it, then such peak can be omitted/rejected as it is not likely a location of a cue point.

If there is a limit on the number of cue points that can be used, the method 100 can use the magnitude of the peaks to order the cue points in order of importance, and the best cue points would be selected.

Typically, automatic cue point detection relies heavily on energy level segmentation, which detects the energy level throughout a song. For example, a song is split up into segments of size 32 beats, and an energy level is determined for each segment as a value from 1 to 9. Cue points are placed where this energy level value changes from one segment to another. If there are more than 8 cue points detected initially, they are sorted in order of largest energy change first, prioritizing increases in energy over decreases, and the best 8 cue points are selected.

Energy levels are calculated on each segment independently, so there are no calculations performed on different audio feature changes from one segment to another, only the calculated energy levels are compared. However, energy level is not always an accurate indicator that a change has taken place in a song, so results can sometimes be poor.

Automatic segmentation of music typically involves an algorithm based on computing the similarity matrix for a song. A number of features are calculated and stored as a feature vector for each audio frame in a song. Each audio frame size may be a constant (for example, 1024 samples) or the audio frames can be beat-synchronized so each frame summarizes the audio between successive beats.

A two-dimensional (2D) self-similarity matrix for the features is then calculated using a distance function. This is computed by applying the distance function to every pair of feature vectors. However, this can be time consuming.

By contrast, the embodiment discussed with respect to FIG. 7, may only compute distance functions for features that are $2^n$ beats apart, corresponding to the length of a phrase or bar. This reduces the amount of noise in the resulting score values, because where a section of music is repetitive the difference between features that are spaced apart by 4, 8, 16, or 32 beats is very low, which is desirable because it would represent an area of the song where a change is likely not taking place. Comparing features that are spaced apart by other beat counts, for example 3, 12, or 17, will generally result in a large difference at every position in the song and is thus unfavorable. This would add unnecessary noise to the resulting score calculation.

The methods that use the self-similarity matrix create a score for each frame in the song, derived from the self-similarity matrix. However, in the method discussed with respect to the present disclosure (in particular, the embodiment of FIG. 7), the distance function is applied separately for each feature, so each feature can be treated differently and has different weights and combining patterns applied to them. This makes sense in a psychoacoustical manner as different audio feature types are perceived differently, and can act in different ways to trigger a sense of change in a song. In the methods that use the self-similarity matrix, all features are treated equally. The distance of all features (feature vector) at a location is compared to the features of another location within the song.

Also, in the aforementioned methods, only pairs of feature vectors are compared directly. In the method discussed with respect to the embodiment of FIG. 7, not only individual features, but also groups of features are combined to achieve more robust results. As illustrated in FIG. 7, $S_{1A}$, $S_{1B}$, and $S_{1C}$ are calculated as well as $S_{1D}$. $S_{1D}$ improves accuracy as it sums up all the beat positions (16) to the left and right of 1:00 minute marker, and then applies a distance function. As illustrated in FIG. 7, $S_{1E}$, $S_{1F}$, $S_{1G}$, and $S_{1H}$ are also calculated. $S_{1E}$, $S_{1F}$, $S_{1G}$, and $S_{1H}$ improve accuracy because each compares groups of 4 sections/beats/portions (features of the transients at different points in time) which have been combined together, for example by summing them.

There is also a difference in the meaning of the score calculated in aforementioned methods. The magnitude of the peaks in the score data does not correlate with how large the change from one phrase to another is perceived by a human, only that a change is likely there. This means that it is not possible to accurately select the best 8 cue points from such score, where "best" means likely that a human would choose cue points for the purpose of, for example DJing. However, the score provided by the present disclosure (in particular, the embodiment of FIG. 7) also accurately takes into account how much a song changes as may be perceived by a human. This is reflected in the accuracy of the calculated cue points when cue point count is limited.

In one embodiment, different musical genres may have different weights assigned thereto in order to achieve an accurate result. As such, the method 100 array automatically determine the genre of a selected song and then automatically change/adjust the weights to correspond to the detected genre.

The method 100 achieves accurate results with high precision. The method 100 consistently outperforms manual cue point determination even when such manual approach is performed by seasoned musicians, DJs, and other experts in the field. Not only does the method 100 outperform the manual approach by producing more accurate results, but it is also able to produce such results in a significantly shorter period of time.

Thus, the method 100 addresses the problem of inaccurate and inconsistent cue point determination that has plagued the industry for some time, while doing so in a quicker and more efficient manner.

The method 100 may provide additional functions. For example, as discussed above, a musical piece (or song) may have a plurality of transitions therein (i.e., intro to chorus, chorus to breakdown, breakdown to drop, etc.). The methodlogy discussed above may be applied a plurality of times to the same song. Each time that it is being applied, weightings and features may be changed or adjusted to only respond to (or pick up on) a specific transistion (for example, intro to chrous). Thus, one application of the method 100 would generate high scores only when transitioning from intro to chorus, and another application of the method 100 would generate high scores only when transitioning from, chorus to breakdown, and so forth. In other words, the method 100 may be iteratively applied a plurality of times with different features/weightings to pick up on different transitions in a song each time. This would result in an accurate representation of the particular transitions throughout a song. The method may display the particular transitions using various indicaters to clearly indicate all the differrent transitions present within the particular song.

The method 100 has a wide array of applications. For example, the cue points generated by method 100 may be displayed as noted above and used by a DJ to mix one song into another live at, for example, a party. This can aid the DJ in visualizing certain sections of the song and decide, for example, the best section to mix into or out of a particular song. Note that when mixing live, time is limited as a DJ likely has the length of a current playing song to decide what song to play next and what section to cue the song from. Thus, having automatically generated cue points that are accurate may be a huge time saver and be the difference between a good (professional-sounding) mix versus a bad (amateur-sounding) mix.

As a second example, the generated cue points may be used by a non-DJ to simply highlight particular sections of a song. For example, the method 100 may be applied to an entire collection of songs (for example, in iTunes or other music library) and generate cue points for each song (and display the cue points within the library). For any given song, a user may then be able to simply play the song by selecting certain cue points within the song (while other parts may be skipped). This would give the song a 'fresh' sound as the song would not play in the same order as it would if originally played.

To this end, the method 100 may include an additional function of controlling how a song is played back based on the cue points. In other words, based on predefined preferences or a selection by a user, the method 100 may control the library player (for example, iTunes player) to play a song by only selecting particular cue points within the song. This can provide the advantage of skipping a section that a particular user may not like (for example, a lengthy intro or breakdown), and playing the song from the chorus chorus followed by drop or vice versa). In other words, parts of a song indicated by the cue marks can be automatically played out of order or even skipped.

As a third example, the generated cue points may be input to a device or a method that perform artificial intelligence mixing (i.e., automatic mixing without any human input). Such device may be, for example, an automated jukebox. In such case, the cue points need not be displayed but simply stored in file metadata/computer memory that can be accessed by the device/method performing the automatic mixing.

Figure 8:
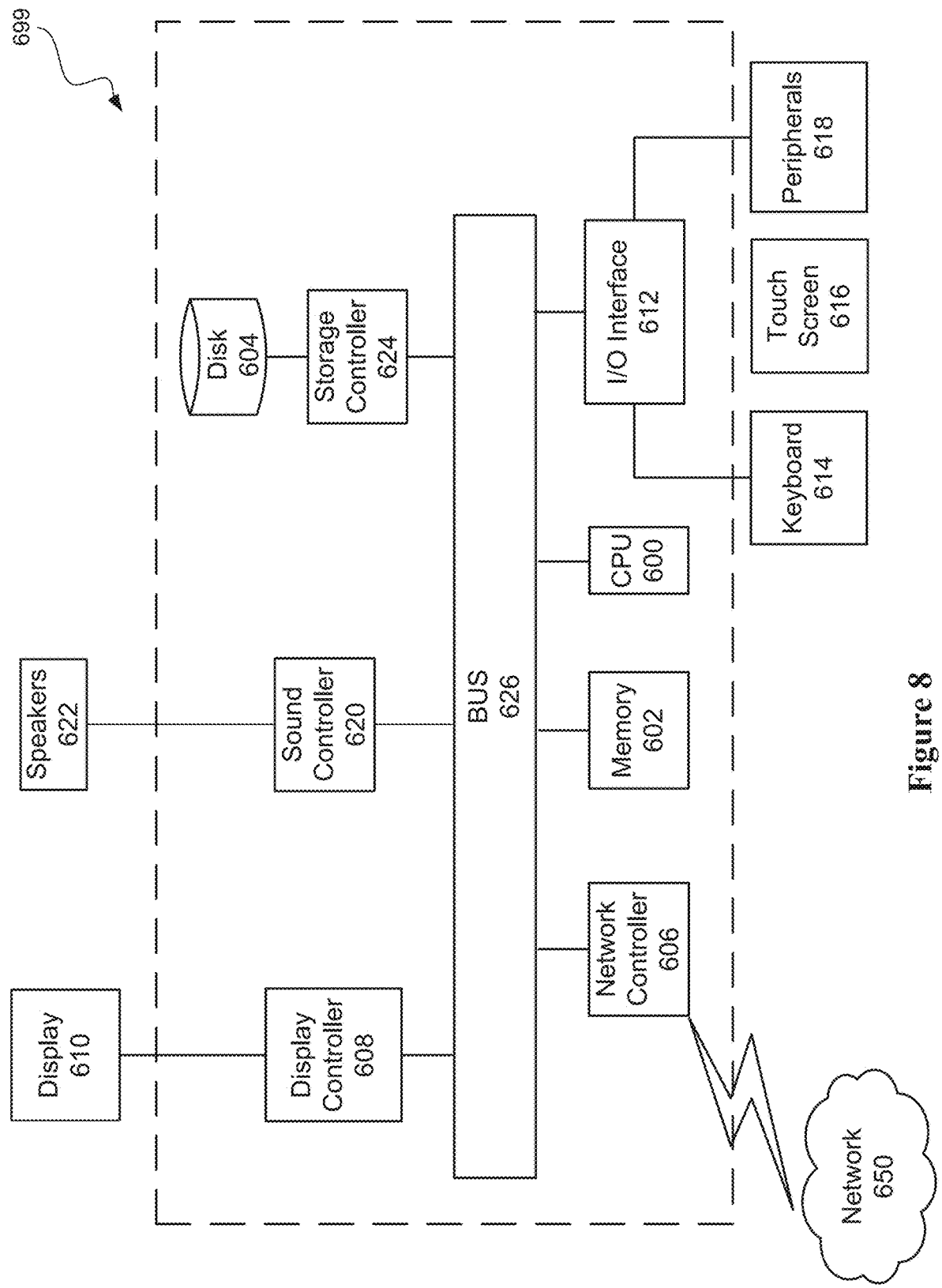
FIG. 8 illustrates a computer system upon which embodiments of the present disclosure may be implemented.

The method 100 of FIG. 1 as well as each of the functions of the above described embodiments may be implemented by circuitry, which includes one or more processing circuits. A processing circuit includes a particularly programmed processor, for example, processor (CPU) 600, as shown in FIG. 8. A processing circuit also includes devices such as an application specific integrated circuit (ASIC) and conventional circuit components arranged to perform the recited functions.

In FIG. 8, the device 699 includes a CPU 600 which performs the processes described above. The device 699 may be a general-purpose computer or a particular, special-purpose machine. In one embodiment, the device 699 becomes a particular, special-purpose machine when the processor 600 is programmed to generate one or more cue points.

Note that device 699 may be a personal computer (PC), a tablet, a cellular/smart phone, a compact disk jockey (CDJ) device, or any other type of general device or DJ-specific device. Hence, the embodiments discussed herein with respect to the method 100 may be implemented on any of these devices.

The process data and instructions may be stored in at least one computer readable medium or memory 602 for holding the instructions programmed according to any of the teachings of the present disclosure and for containing data structures, tables, records, or other data described herein. These processes and instructions may also be stored on a storage medium disk 604 such as a hard drive (HDD) or portable storage medium or may be stored remotely. The instructions may be stored on CDs, DVDs, in FLASH memory, RAM, ROM, PROM, EPROM, EEPROM, hard disk or any other device with which the system communicates, such as a server or computer.

Further, the discussed embodiments may be provided as a utility application, background daemon, or component of an operating system, or combination thereof, executing in conjunction with CPU 600 and an operating system such as, but not limited to, Microsoft Windows, UNIX, Solaris, LINUX, Android, Apple MAC-OS, Apple iOS and other systems known to those skilled in the art.

CPU 600 may be any type of processor that would be recognized by one of ordinary skill in the art. For example, CPU 600 may be a Xenon or Core processor from Intel of America or an Opteron processor from AMD of America. CPU 600 may be a processor having ARM architecture or any other type of architecture. CPU 600 may be any processor found in a mobile device (for example, cellular/smart phones, tablets, personal digital assistants (PDAs), or the like). CPU 600 may also be any processor found in musical instruments (for example, a musical keyboard or the like).

Additionally or alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described herein.

The computer 699 in FIG. 8 also includes a network controller 606, such as, but not limited to, a network interface card, for interfacing with network 650. As can be appreciated, the network 650 can be a public network, such as, but not limited to, the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer 699 further includes a display controller 608, such as, but not limited to, a graphics adaptor for interfacing display 610, such as, but not limited to, an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners. The peripheral elements discussed herein may be embodied by the peripherals 618 in the exemplary embodiments.

A sound controller 620 may also be provided in the computer 699 to interface with speakers/microphone 622 thereby providing sounds and/or music. The speakers/microphone 622 can also be used to accept dictated words as commands.

The general purpose storage controller 624 connects the storage medium disk 604 with communication bus 626, which may be an ISA, EISA, VESA, PCI, or similar. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Obviously, numerous modifications and variations of the present disclosure are possible in light of the above teachings. It is therefore to be understood that within the scope of the appended claims, the invention may be practiced otherwise than as specifically described herein.

For example, advantageous results may be achieved if the steps of the disclosed techniques were performed in a different sequence, if components in the disclosed systems were combined in a different manner, or if the components were replaced or supplemented by other components.

The functions, processes, and algorithms described herein may be performed in hardware or software executed by hardware, including computer processors and/or programmable processing circuits configured to execute program code and/or computer instructions to execute the functions, processes, and algorithms described herein.

The functions and features described herein may also be executed by various distributed components of a system. For example, one or more processors may execute these system functions, wherein the processors are distributed across multiple components communicating in a network. The distributed components may include one or client and/or server machines, in addition to various human interface and/or communication devices (e.g., display monitors, cellular/smart phones, tablets, PDAs). The network may be a private network, such as a LAN or WAN, or may be a public network, such as the Internet. Input to the system may be received via direct user input and/or received remotely either in real-time or as a batch process.

Additionally, some implementations may be performed on modules or hardware not is identical to those described. Accordingly, other implementations are within the scope that may be claimed.

It should be noted that, as used in the specification and the appended claims, the singular forms "a," "an," and "the" include plural referents unless the context clearly dictates otherwise. Further, the embodiments discussed herein may be combined together in any fashion.

The invention claimed is:

1. An apparatus that generates at least a cue point for a musical piece, the apparatus comprising:
processing circuitry configured to
generate a beat grid representing the musical piece,
determine values for the beat grid of the musical piece, the values corresponding to an audio feature of the musical piece, and each value representing an entire duration of each beat in the beat grid of the musical piece,
derive a score for the audio feature at each of a plurality of positions in the beat grid of the musical piece, using some or all of the determined values, the score being derived by comparing, at each of the plurality of positions, combinations of a same number of determined values of the audio feature before a respective position of the plurality of positions with a same number of determined values of the audio feature after the respective position, such that a score for the audio feature at a given position in the musical piece is determined based on determined values at positions before the given position and positions after the given position within the musical piece, and generate the cue point for a particular position of the plurality of positions of the musical piece, based on the score, wherein the processing circuitry is configured to derive the score by performing at least one of a first comparing, a second comparing, a third comparing, and a fourth comparing, the first comparing being of 16 determined values of the audio features before the respective position with 16 determined values of the audio feature after the respective position, the second comparing being of 8 determined values of the audio features before the respective position with 8 determined values of the audio feature after the respective position, the third comparing being of 4 determined values of the audio features before the respective position with 4 determined values of the audio feature after the respective position, and the fourth comparing being of 2 determined values of the audio feature before the respective position with 2 determined values of the audio feature after the respective position.

2. The apparatus according to claim 1, wherein the processing circuitry is further configured to derive the score by adding results of the comparing performed at each of the plurality of positions.

3. The apparatus according to claim 1, wherein the processing circuitry is further configured to determine other values for the beat grid of the musical piece, the other values corresponding to another audio feature of the musical piece, derive another score for the another audio feature at each of the plurality of positions in the beat grid of the musical piece, using some or all of the determined other values, the another score being derived by comparing, at each of the plurality of positions, combinations of determined other values of the another audio feature before the respective position of the plurality of positions with determined values of the another audio feature after the respective position, and generate the cue point for the particular position based on both the score of the audio feature and the another score of the another audio feature.

4. The apparatus according to claim 3, wherein the audio feature corresponds to transient energy and the another audio feature corresponds to melodic energy such that the processing circuitry generates the cue point for the particular position based on the score of the transient energy and the another score of the melodic energy.

5. The apparatus according to claim 4, wherein at least some of the combinations of determined values of the audio feature are different than the combinations of determined other values of the another audio feature.

6. The apparatus according to claim 5, wherein the processing circuitry is further configured to generate a plurality of cue points for particular positions of the plurality of positions, based on both the score of the audio feature and the another score of the another audio feature, each of the generated plurality of cue points being at least 32 beats apart.

7. A method that generates at least a cue point for a musical piece, the method comprising:

generating a beat grid representing the musical piece;

determining values for the beat grid of the musical piece, the values corresponding to an audio feature of the musical piece, and each value representing an entire duration of each beat in the beat grid of the musical piece;

deriving a score for the audio feature at each of a plurality of positions in the beat grid of the musical piece, using some or all of the determined values, the score being derived by comparing, at each of the plurality of positions, combinations of determined values of the audio feature before a respective position of the plurality of positions with determined values of the audio feature after the respective position, such that a score for the audio feature at a given position in the musical piece is determined based on determined values at positions before the given position and positions after the given position within the musical piece; and generating the cue point for a particular position of the plurality of positions of the musical piece, based on the score, wherein the deriving derives the score by performing at least one of a first comparing, a second comparing, a third comparing, and a fourth comparing, the first comparing being of 16 determined values of the audio features before the respective position with 16 determined values of the audio feature after the respective position, the second comparing being of 8 determined values of the audio features before the respective position with 8 determined values of the audio feature after the respective position, the third comparing being of 4 determined values of the audio features before the respective position with 4 determined values of the audio feature after the respective position, and the fourth comparing being of 2 determined values of the audio feature before the respective position with 2 determined values of the audio feature after the respective position.

8. The method according to claim 7, wherein the deriving derives the score by adding results of the comparing performed at each of the plurality of positions.

9. The method according to claim 7, further comprising:

determining other values for the beat grid of the musical piece, the other values corresponding to another audio feature of the musical piece;

deriving another score for the another audio feature at each of the plurality of positions in the beat grid of the musical piece, using some or all of the determined other values, the another score being derived by comparing, at each of the plurality of positions, combinations of determined other values of the another audio feature before the respective position of the plurality of positions with determined values of the another audio feature after the respective position; and generating the cue point for the particular position based on both the score of the audio feature and the another score of the another audio feature.

10. The method according to claim 9, wherein the audio feature corresponds to transient energy and the another audio feature corresponds to melodic energy such that the generating generates the cue point for the particular position based on the score of the transient energy and the another score of the melodic energy.

11. The method according to claim 10, wherein at least some of the combinations of determined values of the audio feature are different than the combinations of determined other values of the another audio feature.

12. The method according to claim 11, further comprising:
  generating a plurality of cue points for particular positions of the plurality of positions, based on both the score of the audio feature and the another score of the another audio feature, each of the generated plurality of cue points being at least 32 beats apart.

13. A non-transitory computer-readable storage medium including computer executable instructions, wherein the instructions, when executed by a computer, cause the computer to perform method that generates at least a cue point for a musical piece, the method comprising:
  generating a beat grid representing the musical piece;
  determining values for the beat grid of the musical piece, the values corresponding to an audio feature of the musical piece, and each value representing an entire duration of each beat in the beat grid of the musical piece;
  deriving a score for the audio feature at each of a plurality of positions in the beat grid of the musical piece, using some or all of the determined values, the score being derived by comparing, at each of the plurality of positions, combinations of determined values of the audio feature before a respective position of the plurality of positions with determined values of the audio feature after the respective position, such that a score for the audio feature at a given position in the musical piece is determined based on determined values at positions before the given position and positions after the given position within the musical piece; and
  generating the cue point for a particular position of the plurality of positions of the musical piece, based on the score, wherein
  the deriving derives the score by performing at least one of a first comparing, a second comparing, a third comparing, and a fourth comparing, the first comparing being of 16 determined values of the audio features before the respective position with 16 determined values of the audio feature after the respective position, the second comparing being of 8 determined values of the audio features before the respective position with 8 determined values of the audio feature after the respective position, the third comparing being of 4 determined values of the audio features before the respective position with 4 determined values of the audio feature after the respective position, and the fourth comparing being of 2 determined values of the audio feature before the respective position with 2 determined values of the audio feature after the respective position.

14. The non-transitory computer-readable storage medium according to claim 13, wherein the deriving derives the score by adding results of the comparing performed at each of the plurality of positions.

15. The non-transitory computer-readable storage medium according to claim 13, further comprising:
  determining other values for the beat grid of the musical piece, the other values corresponding to another audio feature of the musical piece;
  deriving another score for the another audio feature at each of the plurality of positions in the beat grid of the musical piece, using some or all of the determined other values, the another score being derived by comparing, at each of the plurality of positions, combinations of determined other values of the another audio feature before the respective position of the plurality of positions with determined values of the another audio feature after the respective position; and
  generating the cue point for the particular position based on both the score of the audio feature and the another score of the another audio feature.

16. The non-transitory computer-readable storage medium according to claim 15, wherein the audio feature corresponds to transient energy and the another audio feature corresponds to melodic energy such that the generating generates the cue point for the particular position based on the score of the transient energy and the another score of the melodic energy.

17. The non-transitory computer-readable storage medium according to claim 16, wherein at least some of the combinations of determined values of the audio feature are different than the combinations of determined other values of the another audio feature.

* * * * *